US009251130B1

(12) United States Patent
Lynnes et al.

(10) Patent No.: US 9,251,130 B1
(45) Date of Patent: Feb. 2, 2016

(54) TAGGING ANNOTATIONS OF ELECTRONIC BOOKS

(75) Inventors: Brett N. Lynnes, San Jose, CA (US); Edward J. Gayles, Tracy, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 13/077,699

(22) Filed: Mar. 31, 2011

(51) Int. Cl.
G06F 17/00 (2006.01)
G06F 17/24 (2006.01)

(52) U.S. Cl.
CPC .................... G06F 17/241 (2013.01)

(58) Field of Classification Search
CPC .......... G06F 17/241; G06F 17/30882
USPC .......................... 715/230, 232, 231
See application file for complete search history.

(56) References Cited

U.S. PATENT DOCUMENTS

| | | | |
|---|---|---|---|
| 5,146,552 A * | 9/1992 | Cassorla et al. | 715/234 |
| 5,337,407 A | 8/1994 | Bates et al. | |
| 5,764,345 A * | 6/1998 | Fladd et al. | 356/35.5 |
| 5,960,173 A | 9/1999 | Tang et al. | |
| 6,687,878 B1 * | 2/2004 | Eintracht | G06F 17/241 |
| | | | 707/E17.117 |
| 6,714,791 B2 | 3/2004 | Friedman | |
| 7,076,546 B1 | 7/2006 | Bates et al. | |
| 7,103,848 B2 | 9/2006 | Barsness et al. | |
| 7,107,533 B2 | 9/2006 | Duncan | |
| 7,246,118 B2 | 7/2007 | Chastain et al. | |
| 7,257,769 B2 | 8/2007 | Caspi | |
| 7,418,656 B1 * | 8/2008 | Petersen | 715/230 |
| 7,506,246 B2 * | 3/2009 | Hollander | G06F 17/241 |
| | | | 715/230 |
| 7,512,653 B2 | 3/2009 | Krishnasamy et al. | |
| 7,543,213 B2 | 6/2009 | Lin | |
| 7,543,237 B2 | 6/2009 | Kontny et al. | |
| 7,669,213 B1 | 2/2010 | Wick et al. | |
| 7,716,349 B1 | 5/2010 | Hendricks | |
| 7,779,347 B2 * | 8/2010 | Christiansen et al. | 715/230 |
| 7,921,309 B1 | 4/2011 | Isbister et al. | |
| 8,255,818 B2 * | 8/2012 | Bales | G06F 3/0486 |
| | | | 345/440 |
| 8,261,182 B1 * | 9/2012 | Petersen | 715/230 |
| 8,436,911 B2 * | 5/2013 | Leebow | 348/222.1 |
| 8,706,685 B1 * | 4/2014 | Smith et al. | 707/608 |
| 8,751,681 B1 * | 6/2014 | Pendakur | 709/236 |
| 2001/0007980 A1 | 7/2001 | Ishibashi et al. | |
| 2002/0035697 A1 | 3/2002 | McCurdy et al. | |
| 2002/0049787 A1 * | 4/2002 | Keely et al. | 707/512 |
| 2002/0107759 A1 | 8/2002 | An | |
| 2002/0120635 A1 | 8/2002 | Joao | |

(Continued)

OTHER PUBLICATIONS

Shellburne, E-Book Usage in an Academic Library: User Attiutudes and Behaviors, Google 2009, pp. 59-72.*
Kolovski et al., Towards E-Learning via the Semantic Web, Google 2003, pp. 1-6.*
Wolfe, Annotation Technologies: A Software and Research Review, Google 2002, pp. 471-497.*

(Continued)

Primary Examiner — Cong-Lac Huynh
(74) Attorney, Agent, or Firm — Lee & Hayes, PLLC

(57) ABSTRACT

Architectures and techniques are described to tag annotations of electronic books and to manage the tags. In particular implementations, a client device may tag one or more annotations of an electronic book, where each of the annotations may be associated with a portion of the electronic book. The client device may request and obtain annotations associated with one or more tags and export the annotations to at least one destination, such as an additional client device, a file, an application, or a combination thereof. Additionally, annotation tags may be shared by members of a particular group. Thus, one member of the group can obtain and utilize tags used by other members of the group.

24 Claims, 11 Drawing Sheets

(56) References Cited

U.S. PATENT DOCUMENTS

| | | |
|---|---|---|
| 2002/0152215 A1 | 10/2002 | Clark et al. |
| 2002/0178163 A1 | 11/2002 | Mayer |
| 2003/0084404 A1* | 5/2003 | Dweck et al. .................. 715/513 |
| 2004/0008970 A1 | 1/2004 | Junkersfeld et al. |
| 2004/0098275 A1 | 5/2004 | Hubert |
| 2004/0098280 A1 | 5/2004 | Hubert |
| 2004/0111478 A1* | 6/2004 | Gross et al. ................... 709/206 |
| 2004/0261016 A1 | 12/2004 | Glass et al. |
| 2005/0108556 A1 | 5/2005 | DeMello et al. |
| 2005/0132281 A1* | 6/2005 | Pan et al. ....................... 715/515 |
| 2005/0193330 A1 | 9/2005 | Peters |
| 2006/0020882 A1* | 1/2006 | Beezer et al. .................. 715/512 |
| 2006/0053364 A1* | 3/2006 | Hollander et al. ............. 715/512 |
| 2006/0071754 A1 | 4/2006 | Tofts et al. |
| 2006/0075205 A1 | 4/2006 | Martin et al. |
| 2006/0085735 A1 | 4/2006 | Shimizu |
| 2006/0098900 A1 | 5/2006 | King et al. |
| 2006/0161578 A1 | 7/2006 | Siegel et al. |
| 2006/0242554 A1* | 10/2006 | Gerace .............. G06F 17/30867 715/209 |
| 2007/0055926 A1 | 3/2007 | Christiansen et al. |
| 2007/0078965 A1 | 4/2007 | Shimamura et al. |
| 2007/0112913 A1* | 5/2007 | Bales ...................... G06Q 10/10 709/204 |
| 2007/0219958 A1* | 9/2007 | Park et al. ......................... 707/3 |
| 2007/0234140 A1* | 10/2007 | Lee et al. ....................... 714/715 |
| 2008/0059897 A1* | 3/2008 | Dilorenzo ...................... 715/764 |
| 2008/0092181 A1 | 4/2008 | Britt |
| 2008/0098294 A1 | 4/2008 | Le |
| 2008/0154908 A1 | 6/2008 | Datar et al. |
| 2008/0168073 A1 | 7/2008 | Siegel et al. |
| 2008/0195657 A1 | 8/2008 | Naaman et al. |
| 2008/0201632 A1 | 8/2008 | Hong et al. |
| 2008/0222295 A1 | 9/2008 | Robinson et al. |
| 2008/0227074 A1 | 9/2008 | Johnson |
| 2009/0005990 A1* | 1/2009 | Anderson et al. .................. 702/2 |
| 2009/0157522 A1* | 6/2009 | Srinivasan et al. .............. 705/26 |
| 2009/0199082 A1* | 8/2009 | Hollander et al. ............. 715/230 |
| 2009/0204882 A1* | 8/2009 | Hollander et al. ............. 715/230 |
| 2009/0210244 A1* | 8/2009 | Koister et al. ...................... 705/1 |
| 2009/0222400 A1* | 9/2009 | Kupershmidt et al. .......... 706/52 |
| 2009/0271381 A1* | 10/2009 | Beezer et al. ...................... 707/3 |
| 2009/0287714 A1 | 11/2009 | Vasudevan et al. |
| 2010/0057714 A1* | 3/2010 | Miedema ........................... 707/5 |
| 2010/0070845 A1 | 3/2010 | Facemire et al. |
| 2010/0205105 A1* | 8/2010 | Robertson et al. ............. 705/334 |
| 2010/0242074 A1* | 9/2010 | Rouse .................. H04L 12/588 725/100 |
| 2010/0262659 A1 | 10/2010 | Christiansen et al. |
| 2010/0278453 A1* | 11/2010 | King ............................ 382/321 |
| 2010/0290699 A1* | 11/2010 | Adam et al. .................. 382/155 |
| 2011/0087955 A1* | 4/2011 | Ho et al. ........................ 715/230 |
| 2011/0173141 A1* | 7/2011 | Campbell et al. ................ 706/12 |
| 2011/0196863 A1* | 8/2011 | Marcucci .......... G06F 17/30864 707/728 |
| 2011/0225192 A1* | 9/2011 | Imig et al. ....................... 707/775 |
| 2011/0282866 A1* | 11/2011 | Erickson et al. ............... 707/722 |
| 2012/0030729 A1* | 2/2012 | Schwartz et al. .................. 726/1 |
| 2012/0036423 A1* | 2/2012 | Haynes et al. ................. 715/230 |
| 2012/0084634 A1* | 4/2012 | Wong et al. .................... 715/233 |
| 2012/0150859 A1* | 6/2012 | Hu ................................. 707/737 |
| 2012/0173642 A1* | 7/2012 | Rosenberger ................. 709/206 |
| 2012/0210203 A1* | 8/2012 | Kandekar et al. ............. 715/230 |
| 2012/0221938 A1* | 8/2012 | Patterson et al. ............. 715/232 |
| 2012/0254304 A1* | 10/2012 | Anbalagan et al. ........... 709/204 |
| 2013/0021281 A1* | 1/2013 | Tse et al. ....................... 345/173 |
| 2013/0039542 A1* | 2/2013 | Guzik ........................... 382/103 |
| 2013/0104028 A1* | 4/2013 | Murray et al. ................. 715/234 |
| 2013/0166471 A1* | 6/2013 | Fukuda Kelley et al. ..... 705/344 |
| 2013/0325870 A1* | 12/2013 | Rouse et al. ................... 707/741 |
| 2014/0115439 A1* | 4/2014 | Delpha et al. ................. 715/230 |
| 2014/0249889 A1* | 9/2014 | Park et al. ..................... 705/7.32 |

OTHER PUBLICATIONS

Li et al., Towards Effective Browsing of Large Scale Social Annotations, ACM 2007, pp. 943-952.*

Jung et al., Annotating and Sketching on 3D Web Models, ACM 2002, pp. 95-102.*

Steimle et al., Collaborative Paper-based Annotation of Lecture Slides, JSTOR 2009, pp. 125-137.*

Brusilovsky et al., Comprehensive Personalized Information Access in an Educational Digital Library, ACM 2005, pp. 9-18.*

Non-Final Office Action for U.S. Appl. No. 12/260,764, mailed on Jun. 13, 2012, Brent Russell Smith et al., "Organizing Collaborative Annotations", 28 pages.

Final Office Action for U.S. Appl. No. 12/260,713, mailed on Jul. 3, 2012, Brent Russell Smith et al, "Providing Presence Information Within Digital Items", 19 pages.

U.S. Appl. No. 11/763,378, filed Jun. 14, 2007, Lattyak et al., "Transfer of Instructions to a User Device".

U.S. Appl. No. 11/763,381, filed Jun. 14, 2007, Rykov et al., "Selecting and Providing Items in a Media Consumption System".

U.S. Appl. No. 11/763,390, filed Jun. 14, 2007, Bajaj et al., "Providing User-Supplied Items to a User Device".

U.S. Appl. No. 11/763,392, filed Jun. 14, 2007, Ryan et al., "Administrative Tasks in a Media Consumption System".

U.S. Appl. No. 11/763,393, filed Jun. 14, 2007, Lattyak et al., "Incremental Updates of Items".

U.S. Appl. No. 11/763,395, filed Jun. 14, 2007, Ryan et al., "Providing Supplemental Information Based on Hints in a Media Consumption System".

U.S. Appl. No. 11/963,618, filed Dec. 21, 2007, Rykov et al., "Dissemination of Periodical Samples".

Fish et al.,"Quilt: a collaborative tool for cooperative writing", 1998, ACM, pp. 30-37.

Non-Final Office Action for U.S. Appl. No. 12/260,764, mailed on Jul. 6, 2011, Brent Russell Smith, "Organizing Collaborative Annotations".

International Search Report, Application No. PCT/US/08/57829, filed Mar. 21, 2008, 2 pages.

U.S. Appl. No. 12/260,713, filed Oct. 29, 2008, Smith et al., "Providing Presence Information Within Digital Items".

U.S. Appl. No. 12/260,764 , filed Oct. 29, 2008, Smith et al., "Organizing Collaborative Annotations".

Final Office action for U.S. Appl. No. 12/260,764, mailed on Jan. 19, 2012, Smith et al., "Organizing Collaborative Annotations", 23 pages.

Non-Final Office Action for U.S. Appl. No. 12/260,713, mailed on Feb. 23, 2011, Brent Russell Smith et al, "Providing Presence Information Within Digital Items", 15 pages.

U.S. Appl. No. 12/240,842, filed Sep. 29, 2008, Curtis, "Facilitating Discussion Group Formation and Interaction".

Office action for U.S. Appl. No. 12/260,764, mailed on Dec. 21, 2012, Smith et al., "Organizing Collaborative Annotations", 29 pages.

Office action for U.S. Appl. No. 12/260,764, mailed on Apr. 11, 2013, Smith et al., "Organizing Collaborative Annotations", 33 pages.

Office Action for U.S. Appl. No. 12/260,713, mailed on Sep. 25, 2013, Brent Russell Smith, "Providing Presence Information Within Digital Items", 19 pages.

Office action for U.S. Appl. No. 12/260,764, mailed on Sep. 9, 2013, Smith et al,, "Organizing Collaborative Annotations", 34 pages.

Final Office Action for U.S. Appl. No. 12/260,713, mailed on Mar. 18, 2014, Brent Russell Smith, "Providing Presence Information Within Digital Items", 16 pages.

Office Action for U.S. Appl. No. 12/260,713, mailed on Oct. 15, 2014, Brent Russell Smith, "Providing Presence Information Within Digital Items", 16 pages.

* cited by examiner

TAGGING ANNOTATIONS OF ELECTRONIC BOOKS

BACKGROUND

Some computing devices provide users with the opportunity to annotate portions of electronic content, such as electronic books. For example, users may highlight certain portions of an electronic book. Additionally, users may enter text that corresponds to particular portions of the electronic book. In some situations, the users may desire to organize their annotations. For example, students may want to group their annotations that are associated with a particular class. However, computing devices offer few, if any, effective tools to organize annotations.

Further, users may want to access annotations and provide them for use by other applications and/or devices. To illustrate, a user may want to transfer annotations from a computing device used to generate the annotations to another computing device. In another illustration, the user may desire to provide annotations generated by a particular application for use by a different application. In a particular example, a client device user may want to provide annotations to a word processing application or a spreadsheet application in order to manipulate or organize the annotations in a particular manner. Unfortunately, computing devices do not provide user-friendly opportunities to provide annotations to different computing devices or applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
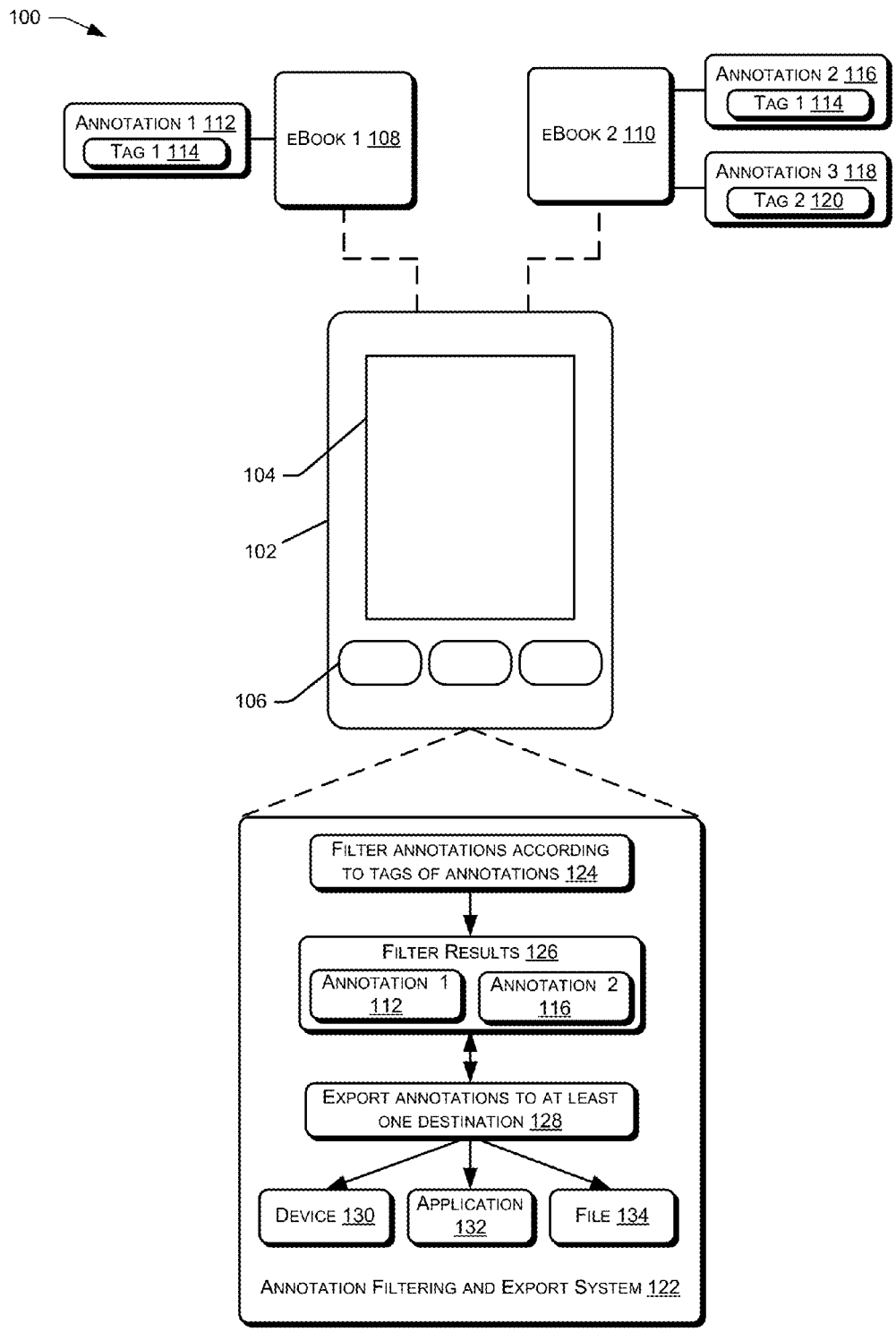
FIG. 1 illustrates a framework to tag annotations of electronic books and export the annotations to various destinations.

This disclosure describes architectures and techniques to tag annotations of electronic books and to manage the tags and annotations. In particular implementations, a client device may tag one or more annotations of an electronic book. Each of the annotations may be associated with at least a respective portion of the electronic book, such as one or more pages of the electronic book, one or more sentences of the electronic book, one or more words of the electronic book, and so forth. In some cases, an annotation may be associated with the entire electronic book. Additionally, annotations associated with multiple electronic books may be associated with the same tag.

The client device may also request and obtain annotations associated with one or more tags and export the annotations to at least one destination. To illustrate, the client device may obtain annotations related to portions of one or more electronic books that are associated with a specific tag, such as "Final Exam." The client device may then provide those annotations to a word processing application, such that an individual can utilize the word processing application to organize the annotations, modify the annotations, and so forth, in order to help the individual study for their final exam. In another illustration, the word processing application or other application designated to receive the annotations may be executing on a different client device. In these cases, the client device, such as an electronic reader device, may export the annotations to the different client device, such as a laptop or tablet computer, to be organized and managed by the individual.

In some situations, annotations may be automatically tagged with a default tag in response to highlighting text of an electronic book. In other cases, annotations may be tagged via a selection of an annotation tagging option. The annotation tagging option may be selectable as part of a process for entering text of an annotation corresponding to a portion of an electronic book. An annotation tagging option may also be provided in a menu that is displayed after an individual has highlighted a portion of an electronic book or selected an annotation that has been previously entered relating to the electronic book. Upon selection of the option to tag the annotation, a particular tag may be applied to the annotation or an additional menu including a list of selectable tags may be provided. When the additional menu is provided, the annotation may be tagged upon selection of a particular tag included in the list of tags included in the additional menu. The list of tags may include recently used tags, frequently used tags, and the like.

In particular implementations, tags may be shared by one or more individuals. In some instances, the individuals may be associated with a particular group. For example, members of a study group or members of a book group may share their tags in order to provide consistency in accessing annotations associated with the different members of the group. In an illustrative implementation, the tags utilized by the members of the group may be accessible and searchable by other members of the group. Thus, one member of the group can obtain and utilize tags used by other members of the group. In some cases, a list of the tags utilized by each member of the group may be compiled and made accessible to the other members of the group. In these cases, when a particular member of the group decides to tag an annotation, a list of tags utilized by the group may be provided and the group member can select a tag from the list. As members utilize new tags, the list of tags associated with the group may be updated. Additionally, redundant tags or tags having a similar appearance or similar meaning may be eliminated or consolidated into a single tag, either by a member of the group or automatically by an application executing on the client device.

Providing a mechanism for individuals to filter and export annotations through tagging, as described herein, can enhance a user's experience with a client device that provides such a mechanism. For example, providing opportunities for a client device user to efficiently organize and manage annotations can increase the convenience of using the client device to study for an exam, write a paper, prepare a presentation, and the like. Furthermore, allowing individuals to access tags that are frequently used by others may improve the quantity and quality of annotations returned with respect to annotation searches based on tagging. In addition, sharing tags between users of a group may improve collaboration within the group since the annotations of each member of the group will be more easily accessible when a common list of tags is utilized.

Some implementations of the architecture and techniques described herein are described in the context of electronic books. However, the architectures and techniques described herein may also be applied to other forms of electronic content, such as content included on pages of sites accessible via a browser application or other content viewing application. The terms "electronic book" and/or "eBook," as used herein, may include electronic or digital representations of printed works, as well as digital content that may include text, multimedia, hypertext, and/or hypermedia. Examples of printed and/or digital works include, but are not limited to, books, magazines, newspapers, periodicals, journals, reference materials, telephone books, textbooks, anthologies, instruction manuals, proceedings of meetings, forms, directories, maps, web pages, etc.

Example Framework

FIG. 1 illustrates a framework 100 to tag annotations of electronic books and export the annotations to various destinations. The framework 100 includes a computing device 102 that provides electronic books to be read by a user of the computing device 102. The user of the computing device 102 may tag annotations of the electronic books. The annotations of the electronic books may be filtered and organized based on the tags associated with the respective annotations. In some cases, the annotations may be generated by the user of the computing device 102, and in other cases, the annotations may be generated by other individuals or obtained from a third-party source, such as a third-party site.

The computing device 102 may include a laptop computer, a desktop computer, a smart phone, an electronic reader device, a mobile handset, a personal digital assistant (PDA), a portable navigation device, a portable gaming device, a tablet computer, a watch, a portable media player, another client device, and the like. The computing device 102 includes a display 104 that is utilized to display electronic content, such as words, illustrations, images, and so forth, of electronic books. The computing device 102 also includes a number of input devices 106 that are operable to type characters, make selections, etc.

The computing device 102 may provide content of a first electronic book 108 and a second electronic book 110. At least a portion of the first electronic book 108 is associated with a first annotation 112 and the first annotation 112 is associated with a first tag 114. Additionally, a second annotation 116 and a third annotation 118 are associated with respective portions of the second electronic book 110. The second annotation 116 is associated with the first tag 114 and the third annotation is associated with a second tag 120. The annotations 112, 116, 118, may include text content, video content, audio content, image content, or a combination thereof, of the first electronic book 108 and the second electronic book 110. Further, the first tag 114 and the second tag 120 may represent respective labels given to the first annotation 112, the second annotation 116, and the third annotation 118.

In an illustrative implementation, the first annotation 112 may include a highlighted portion of the first electronic book 108 and the third annotation 118 may include highlighted portions of the second electronic book 110. The second annotation 116 may include text entered by a user of the computing device, such as a note, that is associated with a particular portion of the second electronic book 110. Continuing with this example, the first tag 114 may be "Final Exam" and the second tag 120 may be "Share with Class." Thus, the first tag 114 may be associated with annotations that a user of the computing device 102 wants to use to study for a final exam of a class, while the second tag 120 may be associated with information that the user of the computing device 102 wants to share with their class.

Additionally, the computing device 102 includes an annotation filtering and export system 122 that may filter annotations based on tags and export the annotations to one or more destinations. In particular, at 124, the annotation filtering and export system 122 may filter annotations according to tags of the annotations. To illustrate, the annotation filtering and export system 122 may generate a request based on user input to obtain annotations associated with a particular tag. In a particular example, the annotation filtering and export system 122 may generate a request to obtain annotations associated with the first tag 114. Consequently, the annotation filtering and export system 122 may search local storage devices of the computing device 102 for annotations associated with the first tag 114. In some instances, the annotation filtering and export system 122 may send a request to a service provider (not shown) to obtain annotations associated with the first tag 114.

The annotations returned in response to the request may be included in filter results 126. In some cases, the annotations of the filter results 126 are generated by the user of the computing device 102, additional individuals, or both. Additionally, the annotations of the filter results 126 may be associated with one or more electronic books. In the illustrative example shown in FIG. 1, the filter results 126 include the first annotation 112 and the second annotation 116, which are both associated with the first tag 114.

The annotation filtering and export system 122 may also, at 128, export annotations to at least one destination. In some situations, the annotations exported at 128 are obtained via the filter results 126. For example, after obtaining the filter results 126, a user of the computing device 102 may select an option to export the first annotation 112 and the second annotation 116 to a particular destination. In other scenarios, the annotations exported may be explicitly selected, such as from a list of annotations or from a portion of the electronic books 108, 110. In any case, the annotations may be exported to one or more of the destinations 130-134. The particular destination(s) 130-134 for the exported annotations may be set by a user of the computing device 102 or one or more default destination(s) 130-134 may be set by the computing device 102. Further, in some instances, annotations may be exported via a centralized server of a service provider (not shown) to a destination, while in other instances, the annotations may be exported via peer-to-peer communications.

In a particular implementation, the destinations 130-134 for exported annotations include one or more devices represented by device 130, one or more applications represented by application 132, and one or more files represented by file 134. The device 130 may include another computing device, such as a personal computer, a laptop computer, a tablet computer, and the like. The application 132 may include a word processing application, a spreadsheet application, a database application, and so forth. Further, the file 134 may include data that is accessible by a number of different applications, such as a word processing application, a spreadsheet application, a browser or other electronic content viewing application, a database application, and the like. The file 134 may also have one of a number of different formats, such that the file 134 is accessible by one or more applications.

By providing opportunities for a user of the computing device 102 to export annotations, the user may conveniently and effectively organize and modify annotations. For example, the computing device 102 may not include an application, such as a word processing application or spreadsheet application, that can be used to organize and modify the annotations. Thus, the annotation filtering and export system 122 may send the annotations to the device 130, which does include an application that can organize and modify annotations. In another example, the annotation filtering and export system 122 may not include an application or functionality that is executable to organize and modify annotations. In these cases, the annotation filtering and export system 122 may invoke the application 132 and send the annotations to the application. The annotation filtering and export system 122 may also send the annotations to a file 134 that is accessible by the application 132, the annotation filtering and export system 122, or both to organize and modify annotations.

Example Architecture

Figure 2:
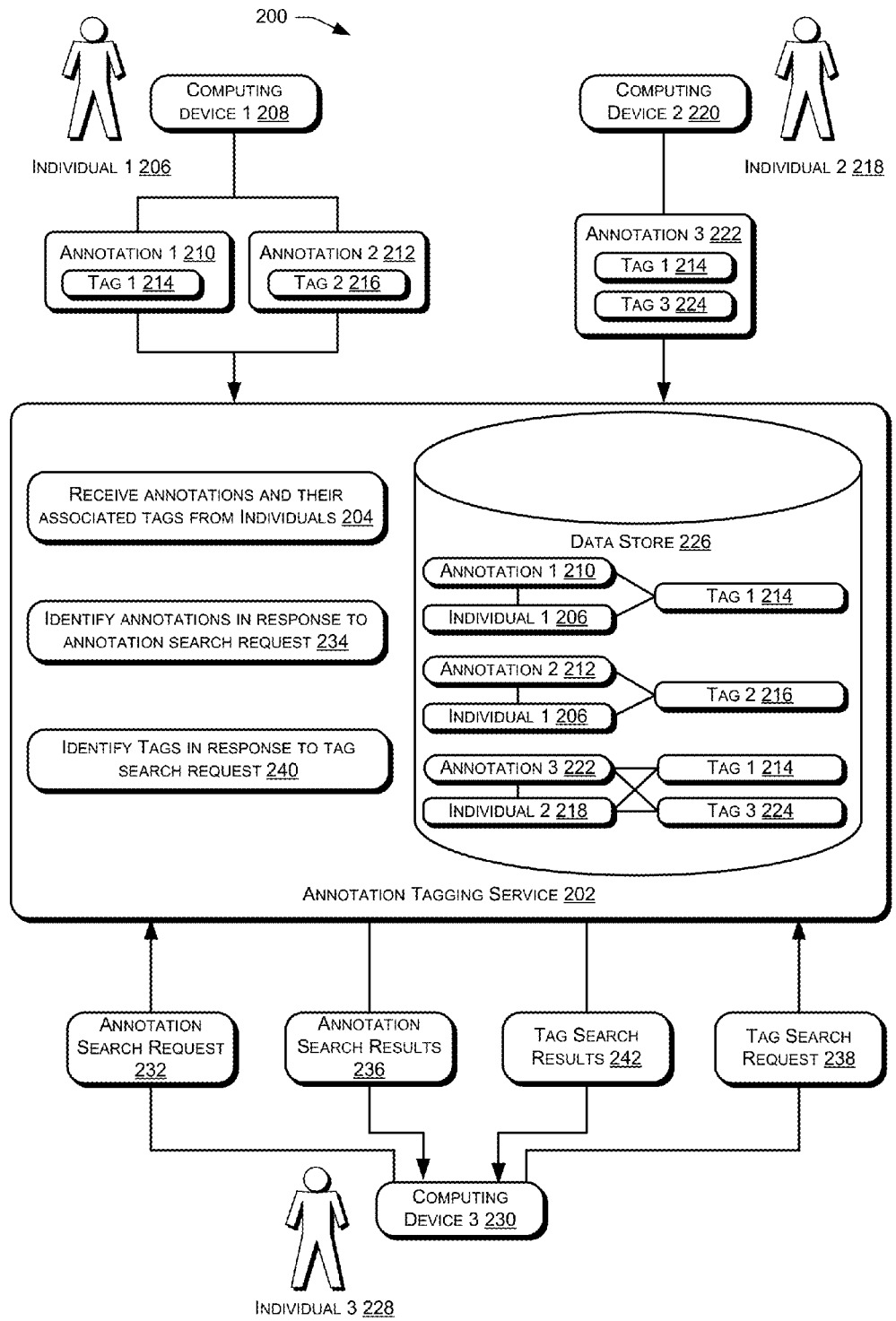
FIG. 2 illustrates an architecture to store annotations and their respective tags and provide a group of individuals access to the tags and annotations.

FIG. 2 illustrates an architecture 200 to store annotations and their respective tags and provide a group of individuals access to the tags and annotations. In particular, the architecture 200 includes an annotation tagging service 202 that, at 204, receives annotations and their associated tags from one or more individuals. In the illustrative example shown in FIG. 2, a first individual 206 operating a first computing device 208 sends a first annotation 210 and a second annotation 212 to the annotation tagging service 202. The first annotation 210 may be associated with a first tag 214 and the second annotation 212 may be associated with a second tag 216 by the first individual 206. Additionally, a second individual 218 operating a second computing device 220 may provide a third annotation 222 associated with the first tag 214 and a third tag 224 to the annotation tagging service 202.

The annotations 210, 212, 222 and the tags 214, 216, 224 may be stored in a data store 224 of the annotation tagging service 204 according to a number of storage mechanisms and according to a number of different data arrangements. For example, the annotations 210, 212, 222 and the tags 214, 216, 224 may be stored in tables of a database. Additionally, each of the annotations 210, 212, 222 may be stored in association with the particular individual 206, 218 and/or computing device 208, 220 that has generated the respective annotations 210, 212, 222. In some cases, an indication of the particular individual 206, 218 and/or computing device 208, 220 that generated one of the annotations 210, 212, 222 is stored separately from the respective annotation 210, 212, 222, but with a link to the respective annotation 210, 212, 222. In other cases, an indication of the particular individual 206, 218 and/or computing device 208, 220 generating the annotations 210, 212, 222 may be stored as a data field of the respective annotation 210, 212, 222. Further, each of the annotations 210, 212, 222 is stored in association with the particular tags 214, 216, 224 that have been linked to the respective annotations 210, 212, 222 by the individuals 206, 218. Further, each of the tags 214, 216, 224 is stored in association with the respective individual 206, 218 that has utilized the respective tags 214, 216, 224 to label the annotations 210, 212, 222. By storing the tags 214, 216, 224 in association with the respective individuals 206, 218 utilizing the tags 214, 216, 224, the annotation tagging service 202 can facilitate the sharing of information indicating tags utilized by particular individuals to label annotations.

The annotation tagging service 202 may provide access to annotations and tags stored by the annotation tagging service 202. For example, a third individual 228 operating a third computing device 230 may access the annotations and tags stored in the data store 226. In some cases, the first individual 206, the second individual 218, and the third individual 228 may be members of a particular group, such as a book group, study group, educational class, social network, and the like.

In an illustrative implementation, the third individual 228 may send an annotation search request 232 to the annotation tagging service 202 via the third computing device 230. The annotation search request 232 may include one or more keywords to identify annotations stored by the annotation tagging service 202. Additionally, the annotation search request 232 may include one or more tags to identify annotations stored by the annotation tagging service 202. In response to the annotation search request 232, at 234, the annotation tagging service 202 may identify annotations stored in the data store 226 matching the criteria (e.g. keywords, tags) of the annotation search request 232. For example, the annotation search request 232 may be a request to identify annotations associated with the first tag 214. The annotation tagging service 202 may then provide the annotations associated with the first tag 214 to the third computing device 230 as annotation search results 236. Thus, in the illustrative example shown in FIG. 2, the annotation tagging service 202 may determine that the first annotation 210 and the third annotation 222 are associated with the first tag 214 and include the first annotation 210 and the third annotation 222 in the annotation search results 236.

Additionally, the third individual 228 may provide a tag search request 238 to the annotation tagging service 202 via the third computing device 230 to identify particular tags stored in the data store 226. To illustrate, the third individual 228 may want to identify tags utilized by other members of a group that the third individual 228 has joined. In other situations, the tag search request 238 may include keywords or other criteria, such as an individual's name, location, and so forth, to identify tags utilized by other individuals and stored by the annotation tagging service 202. In response to the tag search request 238, at 240, the annotation tagging service 202 may identify tags matching the criteria of the tag search request 238 and provide the tags as tag search results 242 to the third computing device 230.

In a particular implementation, when the individuals 206, 218, 228 are members of the same group, the tag search request 238 may indicate a request for the tags utilized by the members of the group. Thus, at 240, the annotation tagging service 202 may identify the first tag 214, the second tag 216, and the third tag 224 as being utilized by the first individual 206 and the second individual 218 and provide the first tag 214, the second tag 216, and the third tag 224 in the tag search results 242. In this way, members of a group may use the same tags while annotating electronic books to facilitate easier searching and sharing of annotations by members of the group.

Example System

Figure 3:
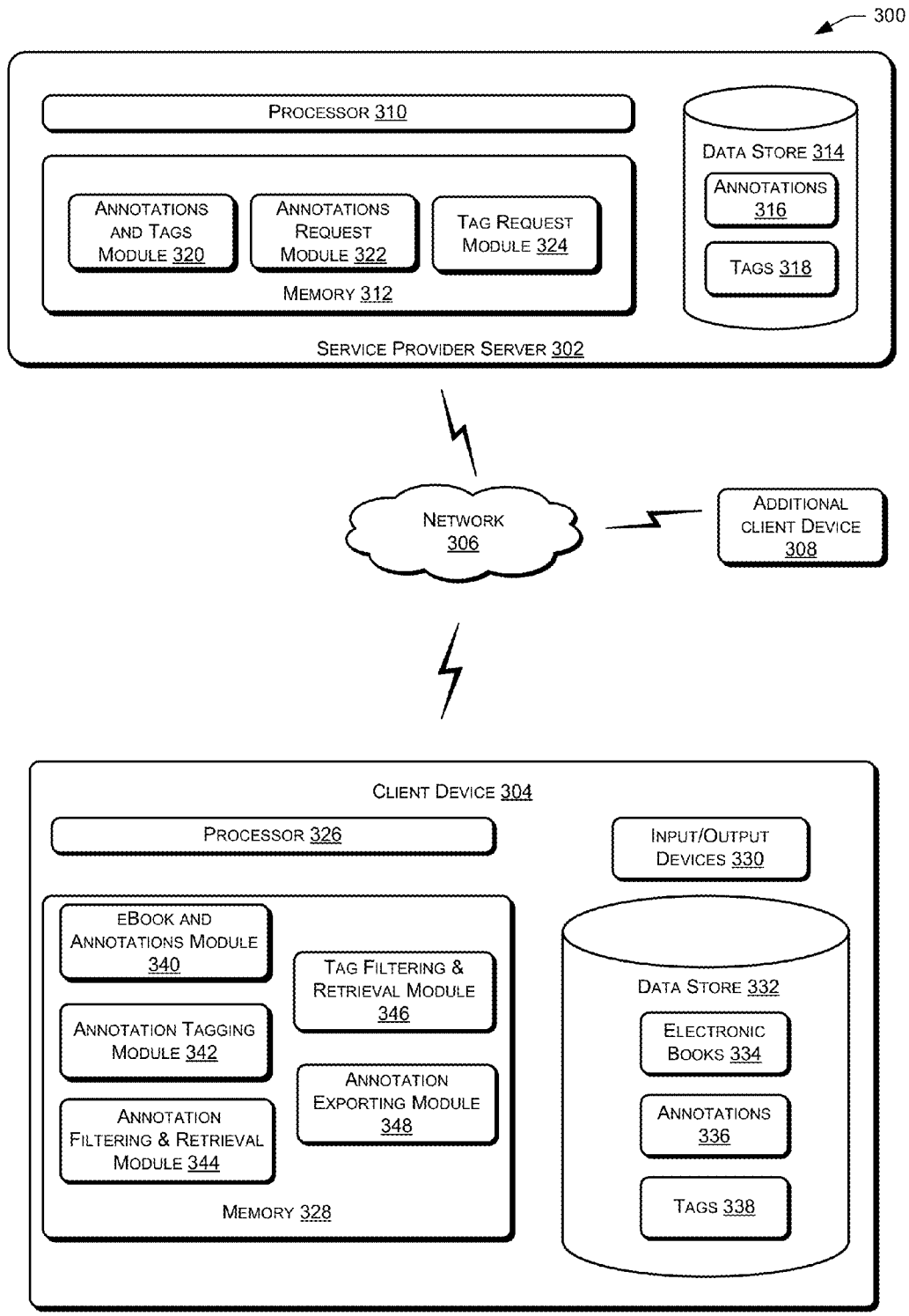
FIG. 3 illustrates a system to tag and manage annotations of electronic books and to share the tags and annotations amongst a number of individuals.

FIG. 3 illustrates a system 300 to tag and manage annotations of electronic books and to share the tags and annotations amongst a number of individuals. The system 300 includes a service provider 302 that may comprise a single server, a cluster of servers, a server farm or data center, and so forth, although other server architectures (e.g., a mainframe architecture) may also be used. The system 300 also includes a client device 304 that may communicate with the service provider 302 via a network 306. The network 306 includes any one or combination of multiple different types of wired and wireless networks, such as the Internet, cable networks, satellite networks, wide area wireless communication networks, wired local area networks, wireless local area networks, and public switched telephone networks (PSTN). The client device 304 may provide electronic books to be read by one or more users of the client device 304. The client device 304 and the service provider server 302 may also be in communication with an additional client device 308 via the network 306.

The service provider server 302 includes one or more processors indicated by the processor 310. The service provider server 302 also includes memory 312 that is accessible by the processor 310. The memory 312 is an example of computer readable storage media and may include volatile memory, nonvolatile memory, removable memory, non-removable memory, or a combination thereof. For example, the memory 312 may include, but is not limited to, RAM, ROM, EEPROM, flash memory, one or more hard disks, solid state drives, optical memory (e.g. CD, DVD), or other non-transient memory technologies. The memory 312 may store a number of modules including computer-readable instructions executable by the processor 310 to facilitate tagging and filtering of annotations of electronic books.

The service provider server 302 also includes a data store 314 that may include, but is not limited to, RAM, ROM, EEPROM, flash memory, one or more hard disks, solid state drives, optical memory (e.g. CD, DVD), or other non-transient memory technologies. The data store 314 may store one or more annotations 316 and one more tags 318 associated with at least a portion of the annotations 316. Further, at least a portion of the tags 318 may be stored in association with the individuals that have utilized respective tags with respect to particular annotations. In some cases, one or more dedicated files or database tables may be created for a particular individual or group to store the tags utilized by the individual or group. Additionally, the tags 318 may include files or tables storing pre-existing tags that are available for use by individuals via the service provider server 302.

The memory 312 of the service provider server 302 includes an annotations and tags module 320, an annotations request module 322, and a tag request module 324 to provide annotation tagging and filtering. In some instances, the modules 320-324 may comprise the annotation tagging service 202 of FIG. 2.

The annotations and tags module 320 may be executable by the processor 310 to obtain annotations and tags from one or more individuals, such as a user of the client device 304, a user of the additional client device 306, and so on. In some situations, the annotations and tags module 320 may receive annotations and their respective tags from the client device 304 and/or the additional client device 308 without first sending a request for the annotations. In other scenarios, the annotations and tags module 320 may send a request to the client device 304 and/or the additional client device 306 for annotations generated by respective users of the client device 304 and the additional client device 306.

The memory 312 also includes an annotations request module 322 that is executable by the processor 310 to receive a request to obtain annotations according to specified criteria. The criteria included in the request may include one or more keywords, one or more tags, and the like. In response to receiving an annotations search request, the annotations request module 322 may identify one or more of the annotations 316 that match the criteria. For example, when the annotations search request includes one or more tags, the annotations request module 322 may identify annotations 316 associated with the one or more tags and provide those annotations to the requesting client device. In another example, the annotations search request may be directed to obtaining annotations generated by a particular individual. In these cases, the annotations request module 322 may identify annotations generated by the particular individual and provide the corresponding annotations to the requesting client device. In some instances, the annotations request module 322 may provide annotations generated by a particular individual and associated with a particular tag in response to an annotations search request. Furthermore, the annotations request module 322 may provide annotations in response to an annotations search request based on a frequency of tagging with respect to the particular annotations. Thus, annotations that have been tagged more frequently and/or have been tagged more frequently with certain tags may be ranked above other annotations when providing results of an annotations search request. The annotations request module 322 may also be executable by the processor 310 to sort annotations upon request according to electronic book, tag, other criteria, and so forth.

The memory 312 also includes a tag request module 324 that is executable by the processor 310 to receive requests for tags matching certain criteria. In some situations, the tag request module 324 may receive requests for tags utilized by individuals in association with a particular electronic book or a particular portion of an electronic book. The tags provided in response to such a request may be the most frequently used tags with respect to the electronic book or with respect to particular portions of the electronic book, tags utilized by one or more particular individuals, or both.

In other instances, the tag request module 324 may receive requests to obtain tags utilized by one or more members of group with respect to annotations of one or more electronic books. To illustrate, the tag request module 324 may receive a request from the client device 304 for tags utilized by members of a group that includes a user of the client device 304. The tag request module 324 may then identify one or more of the tags 318 utilized by the members of the group and provide the corresponding tags to the client device 304. In some situations, a tag request may be directed to obtaining tags utilized by a particular member of a group. Further, the tag request module 324 may receive a request to obtain tags utilized by members of a group with respect to annotations of a particular portion of an electronic book, such as a particular page, chapter, passage, and so forth.

The tag request module 324 may also provide updates to members of the group when additional tags are utilized by members of the group. For example, the annotations and tags module 320 may receive a newly used tag from a member of a particular group and invoke the tag request module 324 to automatically send the newly used tag to other members of the group. The tag request module 324 may also receive tag update requests from client devices for updates to tags utilized by members of a group and provide corresponding responses to the client devices that include any tags newly used by members of the group. The tag request module 324 may also receive a request for tags utilized by members of a group when new members join the group. In these situations, the tag request module 324 may provide the tags utilized by the group with respect to one or more electronic books to the new group member.

The client device 304 includes one or more processors indicated by the processor 326. The client device 304 also includes memory 328 that is accessible by the processor 326. The memory 328 is an example of computer readable storage media and may include volatile memory, nonvolatile memory, removable memory, non-removable memory, or a combination thereof. For example, the memory 328 may include, but is not limited to, RAM, ROM, EEPROM, flash memory, one or more hard disks, solid state drives, optical memory (e.g. CD, DVD), or other non-transient memory technologies. The memory 328 may store a number of modules including computer-readable instructions executable by the processor 326 to facilitate tagging and filtering of annotations of electronic books. The client device 304 also includes input/output devices 330. The input/output devices 330 may include a keyboard, a pointer device, (e.g. a mouse or a stylus), a touch screen, one or more cameras, one or more microphones, a display, speakers, and so forth.

The client device 304 also includes a data store 332 that may include, but is not limited to, RAM, ROM, EEPROM, flash memory, one or more hard disks, solid state drives, optical memory (e.g. CD, DVD), or other non-transient memory technologies. The data store 332 may store one or more electronic books 334. The electronic books 334 may be obtained from the service provider server 304 or from another entity that distributes electronic books. The electronic books 334 may include text content, image content, video content, audio content, or combinations thereof.

The data store 332 also stores annotations 336 of the electronic books 334. The annotations 336 may include highlighted portions of respective electronic books 334 and/or content associated with particular portions of the electronic books 334, such as text content, video content, audio content, image content, etc. The data store 332 also stores tags 338 that are associated with at least a portion of the annotations 336. The tags 338 may represent labels associated with respective annotations 336 by a user of the client device 304, by other individuals, or both.

The memory 328 stores an electronic book and annotations module 340, an annotation tagging module 342, an annotation filtering and retrieval module 344, a tag filtering and retrieval module 346, and an annotation exporting module 348. In some implementations, operations performed by one or more of the modules 340-348, such as annotation creation, tag creation, annotation retrieval, annotation filtering, tag retrieval, and tag filtering, may be performed under the control of an Annotation Manager. The Annotation Manager may also work with one or more additional components of the client device 304 to perform other operations of the modules 340-348, such as annotation importing and exporting.

In the illustrative example shown in FIG. 3, the electronic book and annotations module 340 is executable by the processor 326 to obtain the electronic books 334 from one or more electronic book distribution sources. In some cases, the service provider server 302 may be a part of an electronic book distribution source. The electronic book and annotations module 340 may also be executable by the processor 326 to generate annotations corresponding at least to portions of one or more of the electronic books 334. For example, the electronic book and annotations module 340 may provide a user interface that allows a user of the client device 304 to highlight particular portions of the electronic books 334. In another example, the electronic book and annotations module 340 may provide a user of the client device 304 with tools to enter text that corresponds to particular portions of the electronic books 334. Further, the electronic book and annotations module 340 may provide a user of the client device 304 with tools to associate video content, audio content, third-party text content, image content, or combinations thereof, with particular portions of the electronic books 334.

In addition, the annotation tagging module 342 is executable by the processor 326 to apply tags to annotations of the electronic books 334. In some scenarios, the annotation tagging module 342 may provide user interfaces or portions of user interfaces that can be used to associate a tag with an annotation. In some cases, the annotation tagging module 342 may provide a user of the client device 304 with a user interface to set a default tag. The default tag may be selected from a list of tags or the default tag may be entered by the user of the client device 304. The annotation tagging module 342 may provide an option that is selectable to associate the default tag with an annotation. The annotation tagging module 342 may also associate an annotation with a default tag upon the highlighting of a portion of an electronic book. In some cases, a respective default tag may be set for each electronic book. In other instances, the default tag may be applied with respect to annotations across a number of electronic books.

The annotation tagging module 342 may also provide user interfaces that provide lists of a number of tags that can be applied to annotations of the electronic books 334. In certain situations, the tags provided in the list may be tags utilized by members of a group that includes a user of the client device 304. In other cases, the tags provided in the list may include tags recently used by a user of the client device 304, tags recently used by other individuals, tags most frequently used by the user of the client device 304, tags most frequently used by other individuals, or combinations thereof.

Further, the annotation filtering and retrieval module 344 is executable by the processor 326 to filter and retrieve the annotations 336. For example, the annotation filtering and retrieval module 344 may filter the annotations 336 according to tag, such that annotations associated with one or more particular tags can be obtained. The annotation filtering and retrieval module 344 may also filter the annotations 336 according to other criteria. To illustrate, the annotation filtering and retrieval module 344 may identify annotations associated with one or more particular electronic books, annotations associated with particular portions of one or more electronic books, annotations associated with one or more individuals, and the like. In addition, the annotation filtering and retrieval module 344 may send requests to the service provider server 302 to identify annotations associated with certain criteria. The annotation filtering and retrieval module 344 may also be executable by the processor 326 to sort the annotations 336 by one or more criteria.

The tag filtering and retrieval module 346 is executable by the processor 326 to identify tags used in association with annotations of electronic books. In some implementations, the tag filtering and retrieval module 346 may identify at least a portion of the tags 338 according to one or more criteria, such as most frequently used, most recently used, and the like. The tag filtering and retrieval module 346 may also retrieve any tags that are associated with one or more particular electronic books, any tags that are associated with one or more portions of electronic books, tags that may have been utilized by certain individuals, etc.

Further, the tag filtering and retrieval module 346 may send requests to the service provider server 302 for tags associated with certain criteria. The tag filtering and retrieval module 346 may also obtain tags utilized by members of a group that includes a user of the client device 304. In certain instances, the tag filtering and retrieval module 346 may obtain updates to tags utilized by members of a particular group and also provide tags utilized by a user of the client device 304 to the service provider server 302.

The annotation exporting module 348 is executable by the processor 326 to export one or more of the annotations 336 to at least one destination. For example, the annotation exporting module 348 may export at least a portion of the annotations 336 to another client device, to an application executing on the client device 304, to a particular file stored on the client device 304, or combinations thereof. In an illustrative implementation, one or more of the annotations 336 may be identified for export. In some cases, the annotations 336 to be exported may be identified by the annotation filtering module 344. In a particular example, the annotation filtering module 344 may identify annotations 336 associated with a particular tag 338 and provide these annotations to the annotation exporting module 348. Annotations may also be selected for export via selection by a user of the client device 304.

Additionally, the annotation exporting module 348 may select a destination for the annotations. In some cases, a user of the client device 304 may provide input indicating a particular destination for the annotations. In certain situations, the annotation exporting module 348 may also identify annotation exporting preferences for a user of the client device 304 and export annotations accordingly. To illustrate, a user of the client device 304 may specify a default destination for annotations, a preference for exporting certain annotations to a particular destination, and so forth. When exporting to a file, the user of the client device 304 may specify a preference for the file format and/or a preference for an application that can access the file, such as, a database application, a spreadsheet application, and so on. After determining the at least one destination and any preferences associated with exporting the annotations, the annotation exporting module 348 may then export the annotations 336 to the at least one destination. The annotations exporting module 348 may export annotations to specified destinations via the service provider server 302. In certain scenarios, the annotation exporting module 348 may also export one or more annotations by communicating the one or more annotations to a destination via email, text message, instant message, or some other form of communication.

Example User Interfaces

Figure 4:
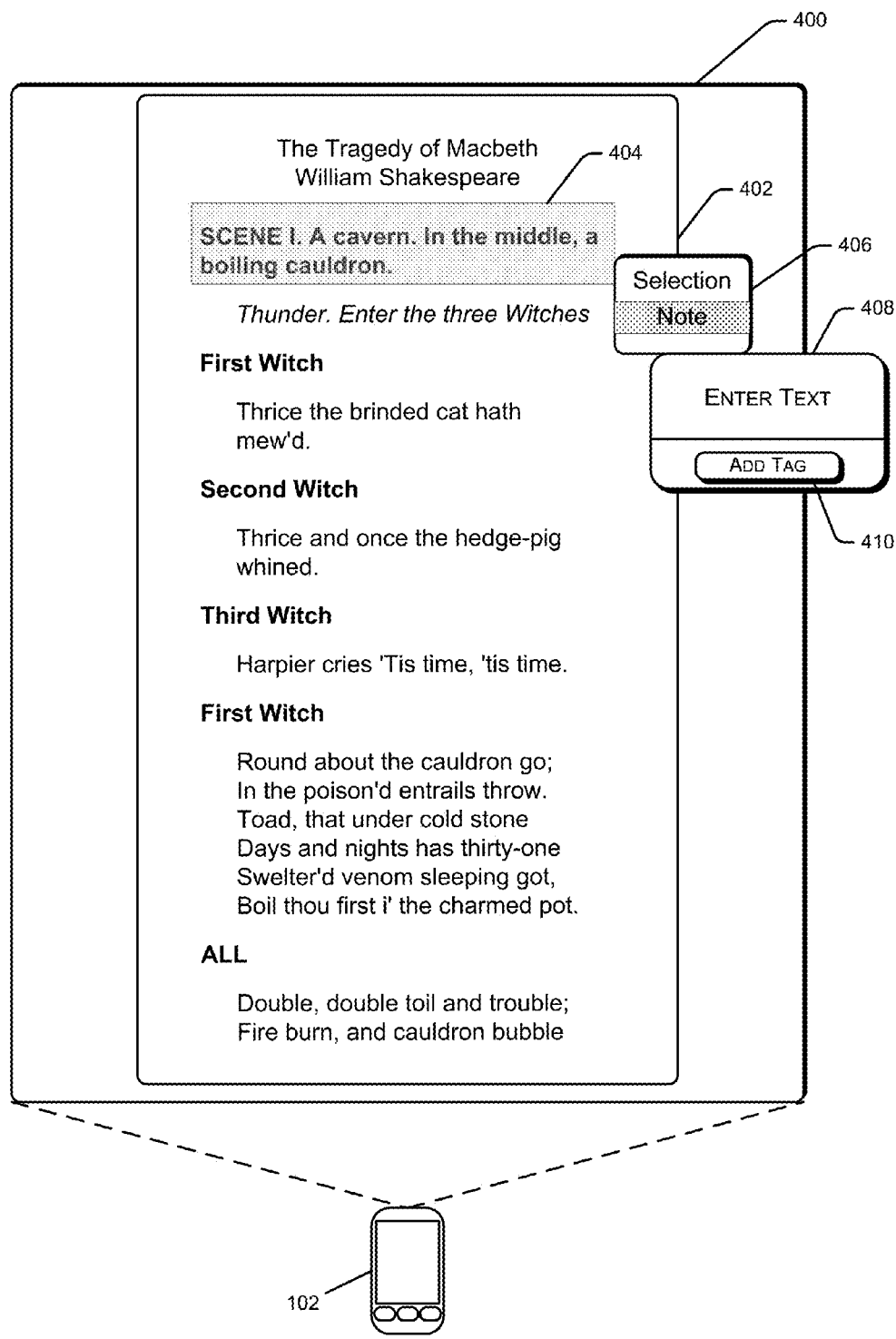
FIG. 4 shows a user interface to associate a tag with a particular annotation of an electronic book.

FIG. 4 shows a user interface 400 to associate a tag with a particular annotation of an electronic book. The user interface 400 may be provided via a display of a computing device, such as the computing device 102. The user interface 400 includes a portion 402 that includes text from an electronic book. In the example illustration of FIG. 4, the electronic book is "The Tragedy of Macbeth" by William Shakespeare.

A user of the computing device 102 may utilize one or more input devices of the computing device 102 to highlight a portion 404 of the electronic book. Upon highlighting the portion 404, a menu 406 may be displayed that provides one or more options with respect to the highlighted portion 404. With respect to the illustrative implementation shown in FIG. 4, the menu 406 includes a respective option to characterize the portion 404 as a "Selection" or as a "Note." The menu 406 of FIG. 4 shows that the highlighted portion 404 has been characterized as a note. In response to the selection of the "Note" option, an additional menu 408 may be displayed. The additional menu 408 includes a portion to enter text of a note, which is a type of annotation, that is associated with the highlighted portion 404. The additional menu 408 also includes an option 410 that is selectable to associate a tag with the note. In some cases, the tag associated with the note upon selection of the option 410 is a default tag. In other cases, the option 410 may be selectable to choose a tag from among a number of tags. Further, the additional menu 408 may include an option (not shown) to change a default tag and/or an option (not shown) to complete entry of the note with or without associating a tag with the note.

Figure 5:
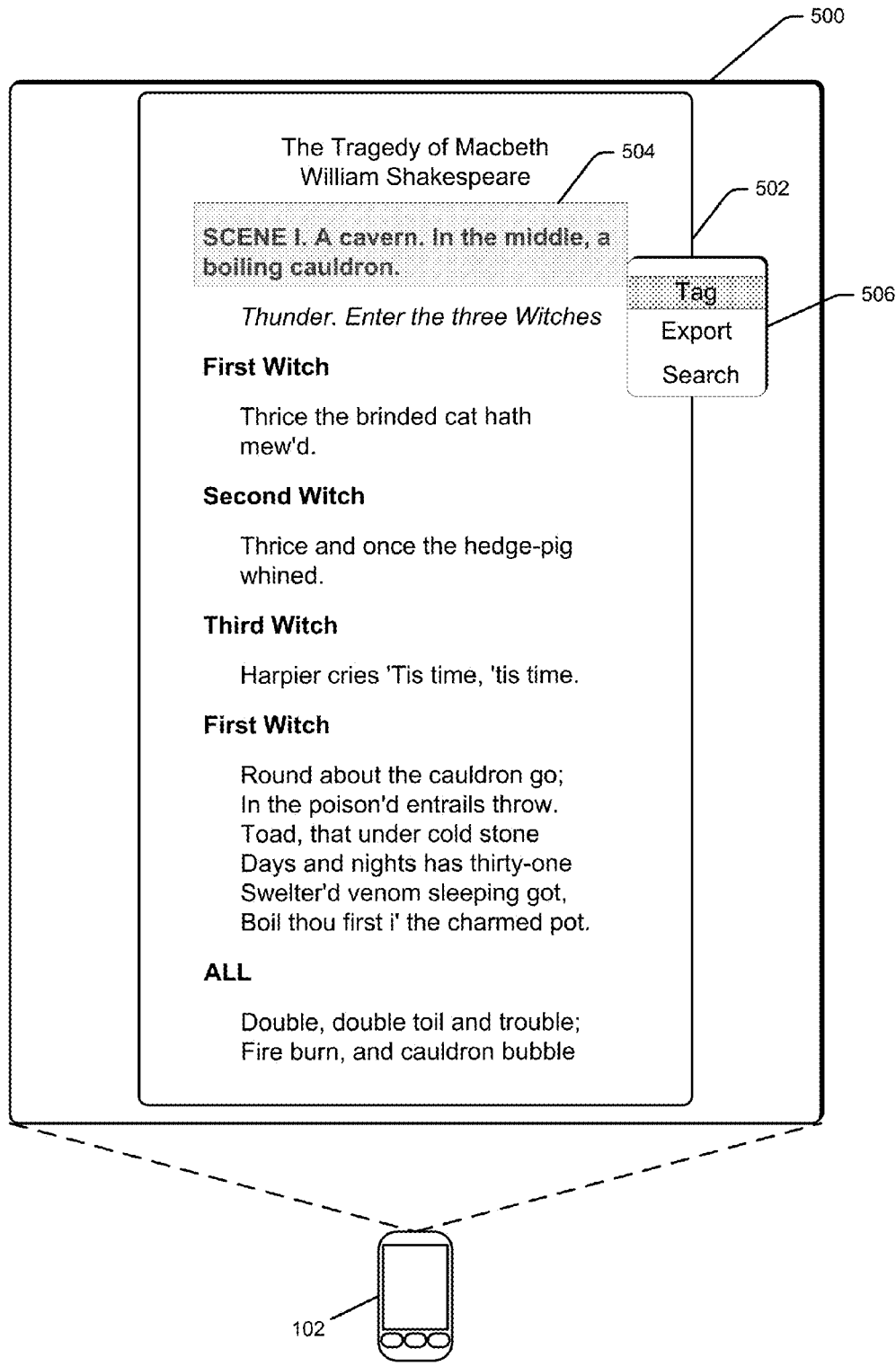
FIG. 5 shows a user interface to tag highlighted portions of an electronic book.

FIG. 5 shows a user interface 500 to tag highlighted portions of an electronic book. The user interface 500 may be provided via a display of a computing device, such as the computing device 102. The user interface 500 includes a portion 502 that includes text from an electronic book.

A user of the computing device 102 may utilize one or more input devices of the computing device 102 to highlight a portion 504 of the electronic book. The highlighted portion 504 may be considered an annotation of the electronic book. Additionally, the highlighted portion 504 may be tagged by a user of the computing device 102 via a menu 506. The menu 506 includes selectable options to "Tag" the highlighted portion 504, such as with a default tag, "Export" the highlighted portion 504 to a destination, or "Search" for content related to the highlighted portion 504. The menu 506 may be provided in the user interface 500 in response to one or more inputs by the user of the computing device 102, such as by hovering over the highlighted portion 504 with a pointing device, selecting the highlighted portion 504 with a pointing device (e.g. right clicking the highlighted portion 504, double clicking the highlighted portion 504, etc.), selecting the highlighted portion 504 via a touch screen portion of the user interface 500, and the like. Additionally, in some implementations, the highlighted portion 504 may be associated with a default tag merely through the highlighting operation of the portion 504 of the electronic book. In these implementations, the menu 506 may be unnecessary in order to associate the portion 504 with a respective tag.

Figure 6:
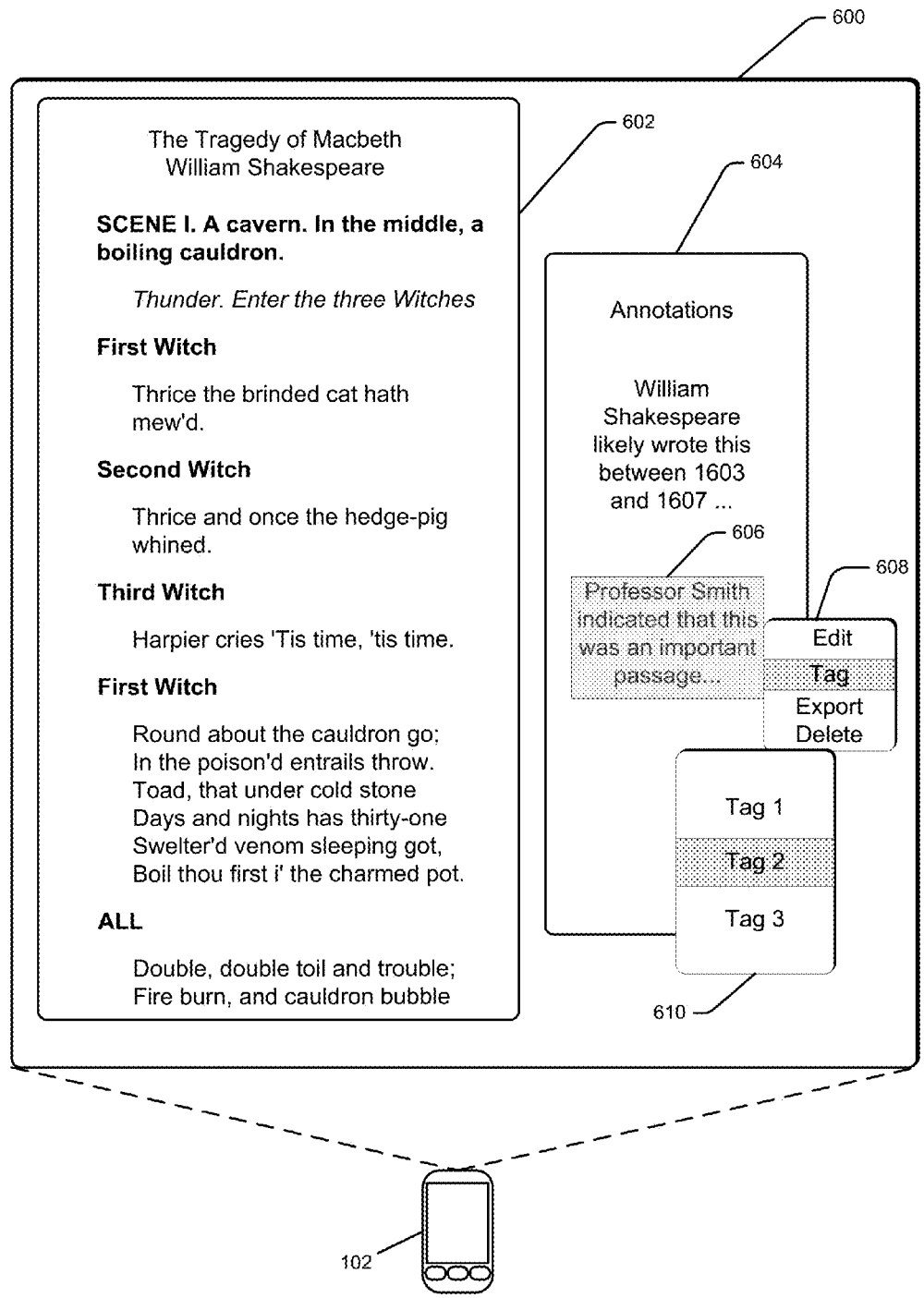
FIG. 6 shows a user interface to tag annotations entered by a user of a computing device.

FIG. 6 shows a user interface 600 to tag annotations entered by a user of a computing device. The user interface 600 may be provided via a display of a computing device, such as the computing device 102. The user interface 600 includes a portion 602 that includes text from an electronic book. The user interface 600 also includes a portion 604 that includes annotations associated with the content of the electronic book shown in the portion 602 of the user interface 600.

A user of the computing device 102 may tag one or more of the annotations shown in the section 604. In the illustrative example shown in FIG. 6, an annotation 606 has been selected by a user of the computing device 102. In a particular implementation, upon selection of the annotation 606, a menu 608 may be provided that includes an option, among others, to "Tag" the annotation 606. In some cases, selection of the "Tag" option may tag the annotation with a default tag. In other cases, selection of the "Tag" option may cause another menu 610 to be provided. The menu 610 may include a number of tags that can be applied to the annotation 606. The tags shown in the menu 610 may include one or more tags most recently used by a user of the computing device 102, one or more tags most frequently used by a user of the computing device 102, one or more tags most frequently used by other individuals, or combinations thereof. In the example shown in FIG. 6, "Tag 2" has been selected to apply to the annotation 606.

Figure 7:
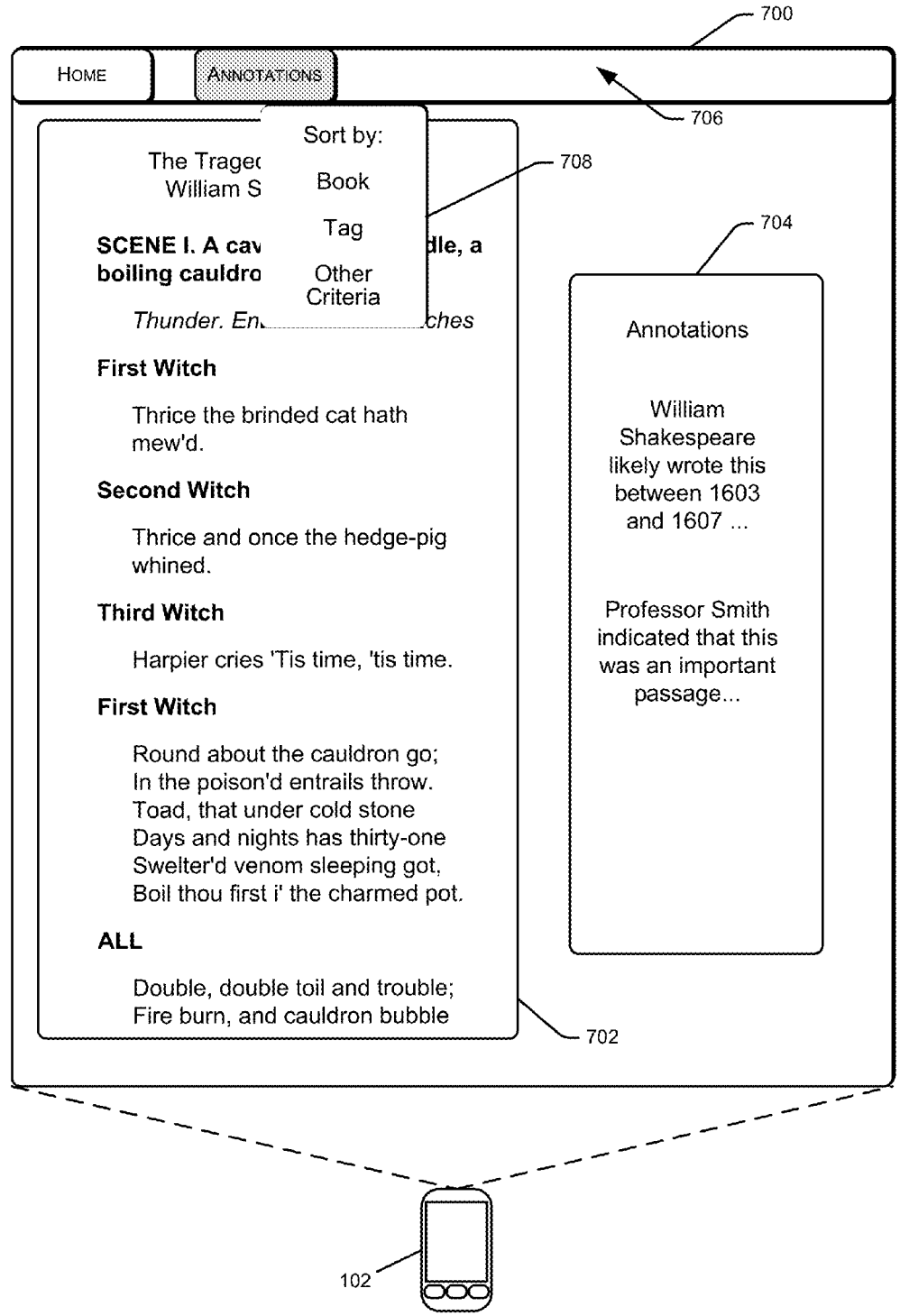
FIG. 7 shows a user interface including a menu with a number of options that are selectable with respect to sorting annotations.

FIG. 7 shows a user interface 700 including a menu with a number of options that are selectable with respect to sorting annotations. The user interface 700 may be provided via a display of a computing device, such as the computing device 102. The user interface 700 includes a portion 702 that includes text from an electronic book.

The user interface 700 also includes a portion 704 that includes annotations associated with content of the electronic book. In some cases, the annotations shown in the portion 704 may be associated with one or more sections of the text shown in the portion 702 of the user interface 700. The portion 704 may also include annotations provided in response to a particular sorting operation. To illustrate, the user interface 700 includes a number of selectable menus shown in a menu bar 706. In the illustrative implementation shown in FIG. 7, when the menu "Annotations" is selected, an additional menu 708 may be displayed. The additional menu 708 includes one or more options that are selectable to sort annotations. For example, the additional menu 708 may include a "Book" option that is selectable to sort annotations by electronic book. In some implementations, the annotations associated with the particular electronic book shown in the user interface 700 may be provided in response to selection of the "Book" option in the additional menu 708. In other situations, selection of the "Book" option may allow a user of the computing device 102 to obtain annotations associated with one or more additional electronic books. The annotations provided in response to selection of the "Book" option may be shown, in some cases, in the portion 704 of the user interface 700 or in another window dedicated to the annotation sorting option.

Further, the additional menu 708 includes a "Tag" option to sort annotations based on one or more tags associated with particular annotations. In some instances, selection of the "Tag" option may sort annotations according to a default tag. In other scenarios, selection of the "Tag" option may cause another menu to appear that includes one or more tags that may be selectable to sort annotations. Annotations returned in response to selection of the "Tag" option may be provided in the portion 704 or in another window dedicated to annotation sorting. In addition, the additional menu 708 may include one or more "Other Criteria" that can be utilized to sort annotations.

Figure 8:
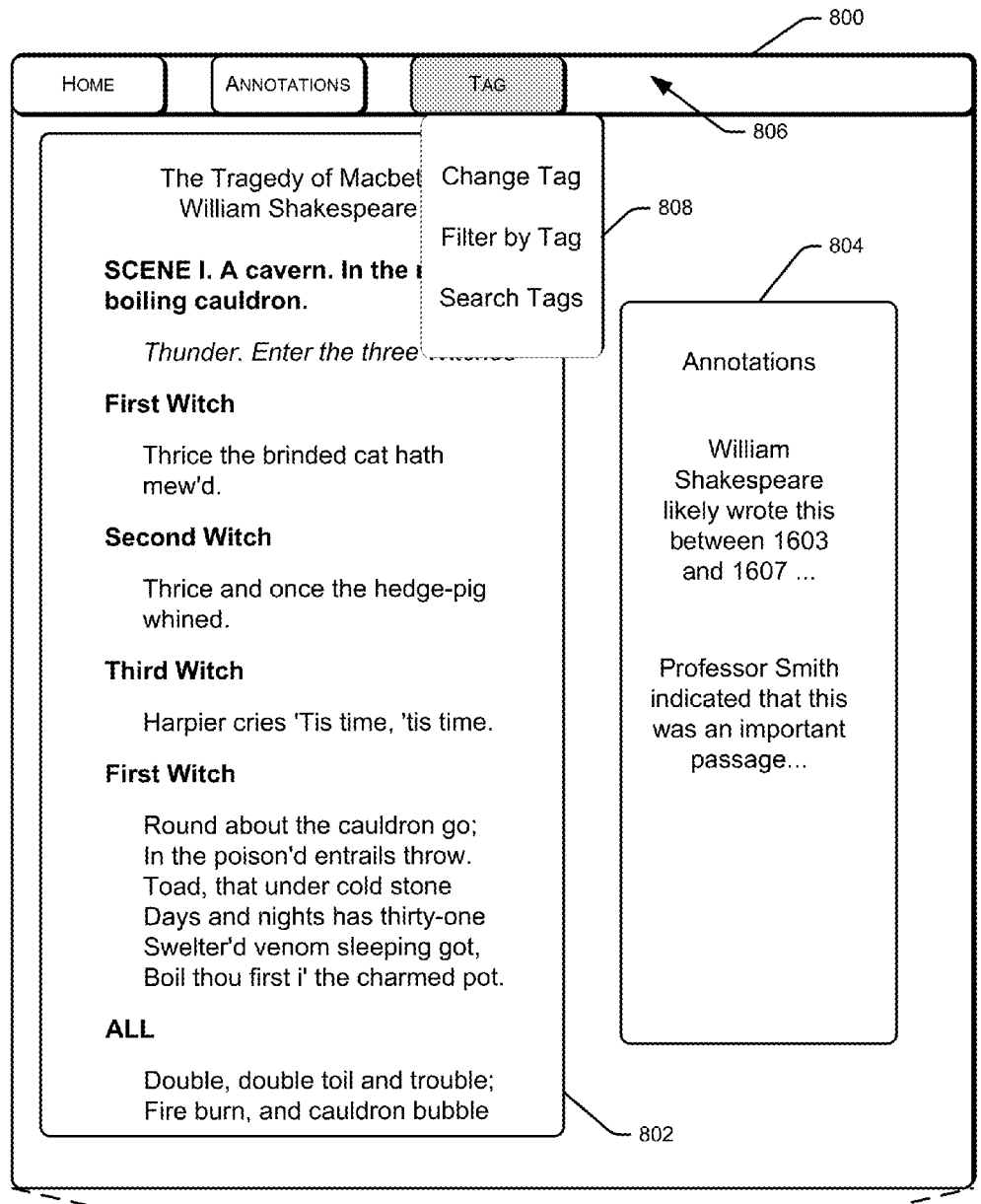
FIG. 8 shows a user interface including a menu with a number of options that are selectable to perform functions with respect to tags of annotations.
Figure 8:
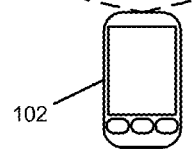

FIG. 8 shows a user interface 800 including a menu with a number of options that are selectable to perform functions with respect to tags of annotations. The user interface 800 may be provided via a display of a computing device, such as the computing device 102. The user interface 800 includes a portion 802 that includes text from an electronic book. The user interface 800 also includes a portion 804 that includes annotations associated with the content of the electronic book shown in the portion 802 of the user interface 800.

Further, the user interface 800 includes a number of selectable menus shown in a menu bar 806. In the particular example shown in FIG. 8, when the "Tag" menu is selected, an additional menu 808 is provided that includes options related to tagging of annotations. For example, the additional menu 808 includes an option to change the default tag used to tag annotations of the electronic book. In another example, the additional menu 808 includes an option to filter annotations according to tags associated with the annotations. The additional menu 808 also includes an option to search for tags, such as tags associated with certain criteria or tags utilized by members of a particular group.

Example Processes

Figure 9:
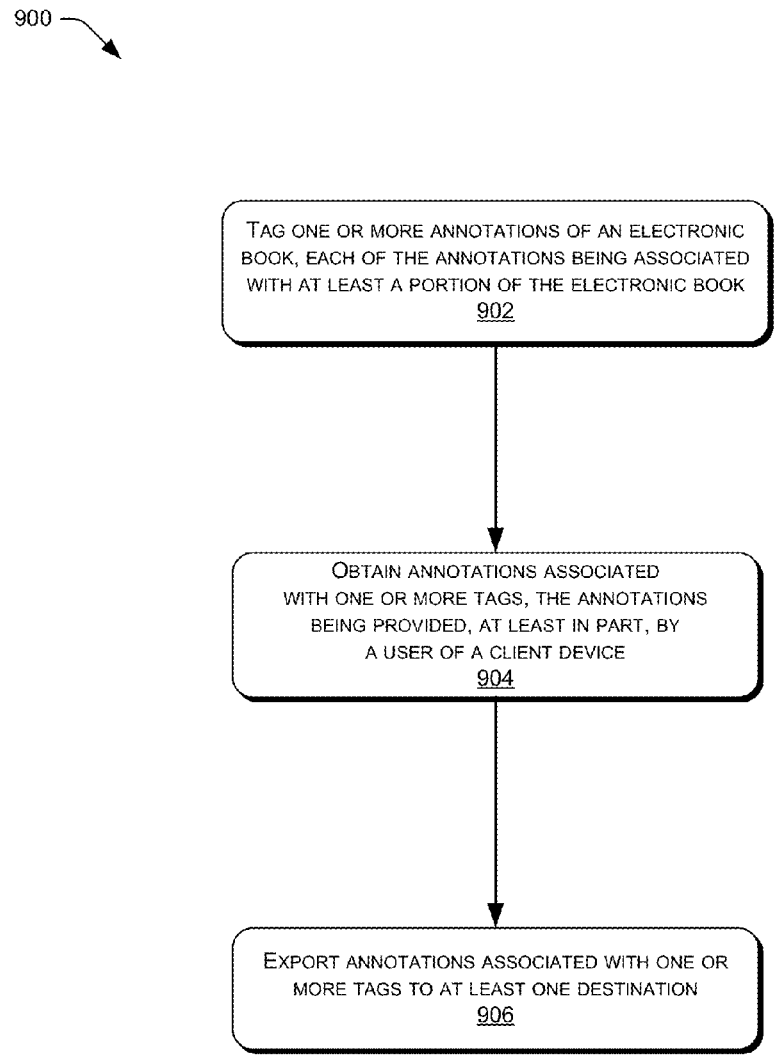
FIG. 9 is a flow diagram of a process to tag annotations of electronic books and export the annotations to at least one destination.
Figure 10:
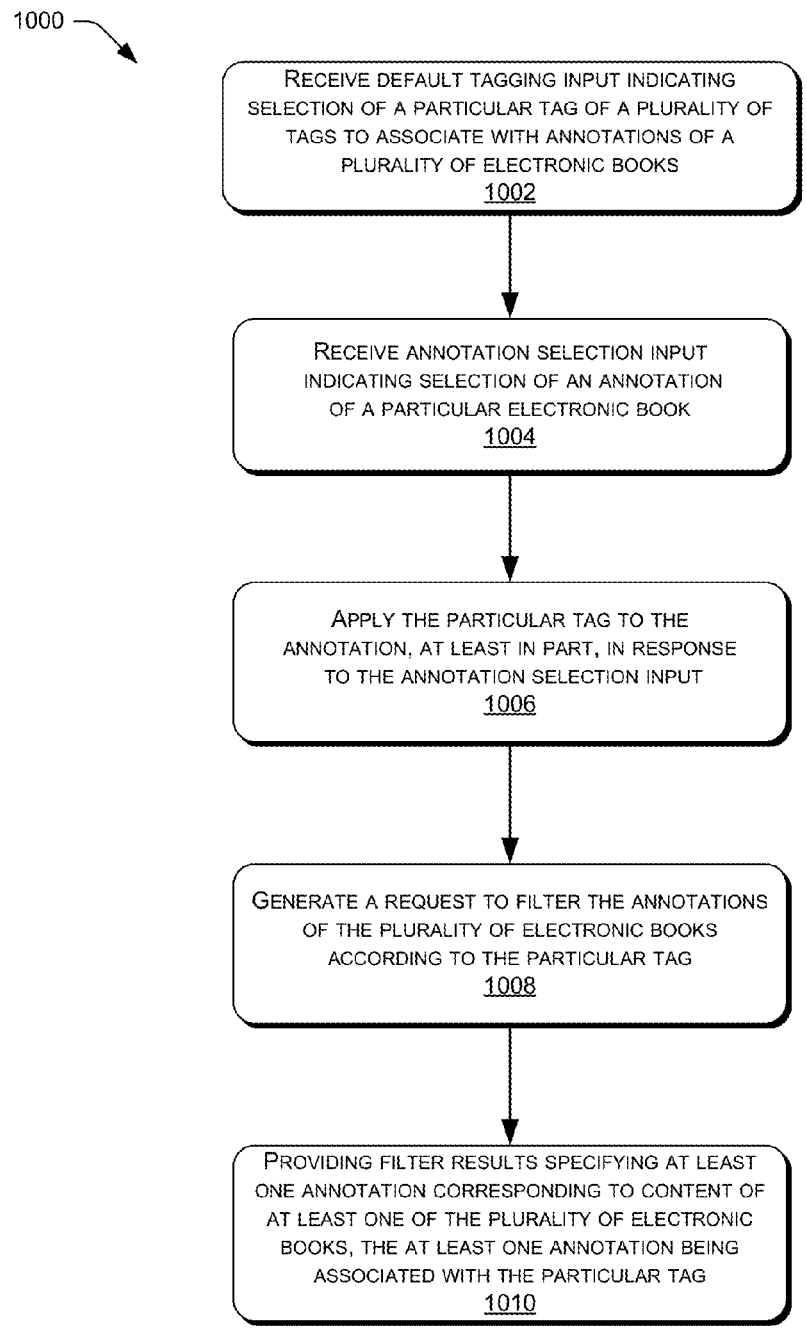
FIG. 10 is a flow diagram of a process to tag annotations of an electronic book according to a default tag and to filter annotations based on respective tags associated with the annotations.
Figure 11:
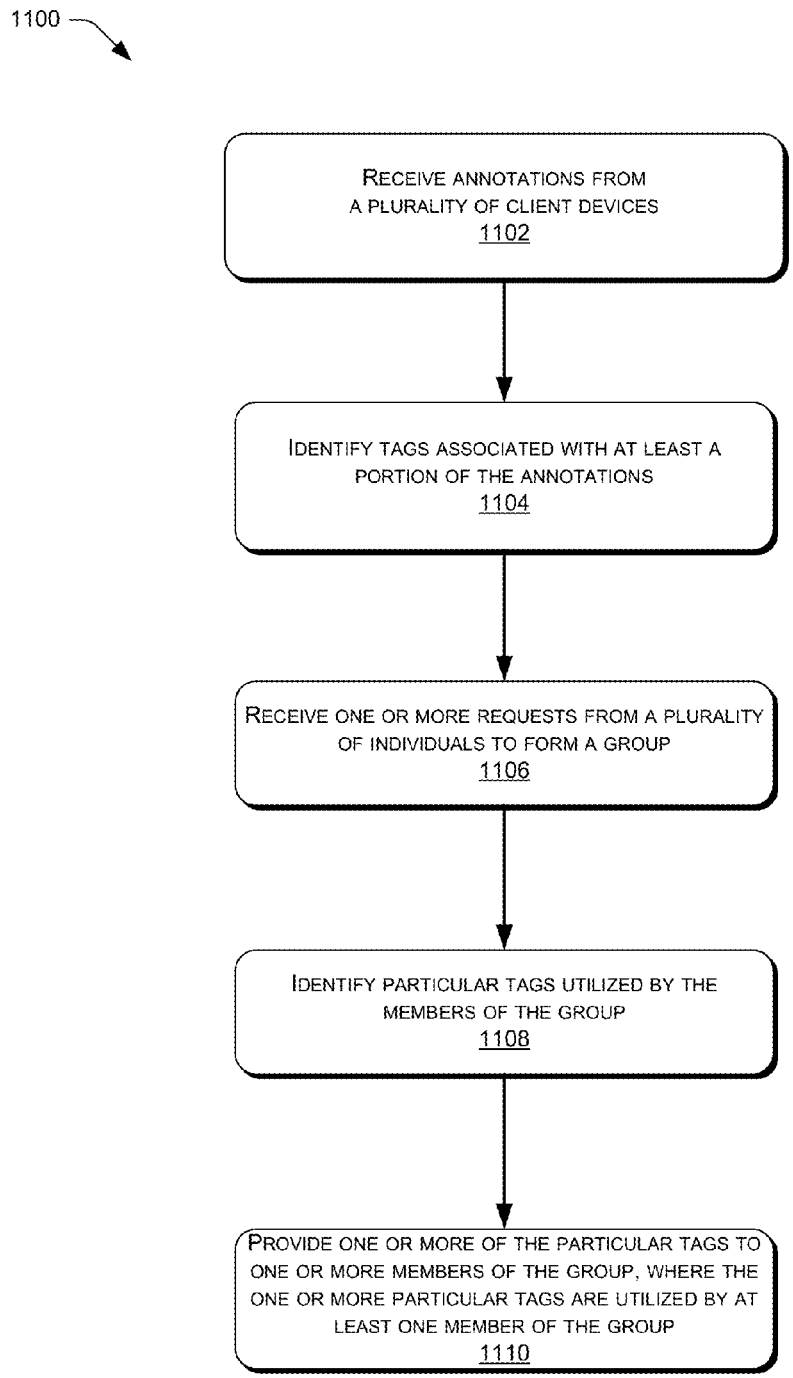
FIG. 11 is a flow diagram of a process to provide tags of annotations utilized by members of a particular group.

FIGS. 9-11 show processes 900-1100 respectively, to tag annotations of electronic books. The processes 900-1100 are illustrated as a collection of blocks in a logical flow graph, which represent a sequence of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The operations described in FIGS. 9-11 may be performed by one or more of the components shown in FIGS. 1-8, such as the computing devices 102, 208, 220, 230, the client devices 304, 308, the service provider server 302, other computing devices, or a combination thereof.

FIG. 9 is a flow diagram of a process 900 to tag annotations of electronic books and export the annotations to at least one destination. The process 900 includes, at 902, tagging one or more annotation of an electronic book. Each of the annotations is associated with at least a portion of the electronic book. For example, the annotations may include highlighted portions of the electronic book, text content entered via a computing device that corresponds to a particular portion of the electronic book, audio content associated with a particular portion of the electronic book, video content associated with a particular portion of the electronic book, and so forth.

At 904, the process 900 includes obtaining annotations associated with one or more tags. In some cases, the annotations may be obtained from files, database tables, and the like, storing annotations that have been provided by a particular user of a client device. The annotations may also correspond to annotations generated by other individuals, such as members of a group that includes the particular user of the client device. In some cases, the annotations may be obtained from an annotation tagging service or service provider server. In a particular implementation, the annotations may be provided in response to a request to filter annotations, such as identifying annotations associated with a particular tag. In other situations, the annotations may be selected from one or more lists of annotations by the particular user of the client device.

At 906, the annotations may be exported to at least one destination. In some cases, the at least one destination may be determined based, at least in part, on input from the particular user of the client device. The at least one destination may include an additional device, such as an additional client device, a server, etc. The at least one destination may also include an application executing on the client device and/or a file stored on the client device or stored remotely. In some scenarios, when annotations are to be exported remotely from the client device, the annotations may be sent to a centralized server that delivers the annotations to a final destination, such as an additional client device, an application, a file, etc. In other cases, the annotations may be exported via peer-to-peer communications.

FIG. 10 is a flow diagram of a process 1000 to tag annotations of an electronic book according to a default tag and to filter annotations based on respective tags associated with the annotations. At 1002, the process 1000 includes receiving default tagging input indicating selection of a particular tag of a plurality of tags to associate with annotations of a plurality of electronic books. In some cases, the default tag may be applied upon selection of a particular tagging option. In certain instances, the default tagging input may correspond to selection of multiple default tags to apply to annotations of the plurality of electronic books. An example of a user interface including a tagging option to apply a default tag is shown in FIG. 5. In some situations, a user of a client device may change the default tag, at which time the new default tag can be applied to annotations. In some scenarios, the plurality of electronic books may be stored at a particular client device.

Additionally, at least some of the plurality of electronic books may be stored remotely from the particular client device.

At 1004, the process 1000 includes receiving annotation selection input indication selection of an annotation of a particular electronic book. For example, a client device user may highlight a portion of the electronic book. In another example, the client device user may have provided annotations by entering notes at some point while reading the electronic book that relate to a particular portion of the electronic book and/or associating supplemental content with a portion of the electronic book, such as audio content, video content, links to third-party sites, and so forth. In these cases, the client device user may select the notes and/or supplemental content and provide the corresponding annotation selection input with respect to the selected annotations.

Additionally, at 1006, the process 1000 includes the client device or a server applying a tag to the selected annotations, at least in part, in response to the annotation selection input. In certain situations, the particular tag may also be applied in response to receiving a specific annotation tagging input to apply the particular tag to the annotation. In one example, an annotation tagging input may include selection of an option, such as the "Tag" option of the additional portion 506 of FIG. 5 or selection of the "Tag" option and the "Tag 2" option of the portions 608 and 610 of FIG. 6.

At 1008, the process 1000 includes generating a request to filter the annotations of the plurality of electronic books according to a specified tag. In some situations, the tag of the filter request may be the default tag. In other cases, the tag may be selected from a list of tags. In certain implementations, one or more of the tags included in the list may have been provided in response to a request from the user of the client device to identify the tags associated with the plurality of electronic books.

At 1010, filter results are provided that indicate at least one annotation corresponding to at least a portion of the plurality of electronic books, where the at least one annotation is associated with the specified tag. In some scenarios, the filter results may include annotations associated with tags having a similar spelling to the specified tag of the filter request, annotations associated with tags having a similar meaning as the specified tag, or both. For example, tags that may include misspelled words or words that are variations of each other (e.g. run, running, runs) may be considered to have similar spellings. Words having similar meaning may be identified via dictionaries, thesauruses, or other reference materials (e.g. run and jog). In some cases, the similarity of the spellings and/or meanings may need to be within a specified threshold.

FIG. 11 is a flow diagram of a process 1100 to provide tags of annotations utilized by members of a particular group. At 1102, the process 1100 includes receiving annotations from a plurality of client devices. For example, an annotation tagging service or a service provider server may receive annotations associated with a number of electronic books from a number of client devices. At 1104, tags associated with at least a portion of the annotations are identified. For example, individuals reading the electronic books may tag the annotations of the electronic books and those tags may also be provided to the annotation tagging service or service provider server.

At 1106, the process 1100 includes receiving one or more requests from a plurality of individuals to form a group, such as a study group, book group, or social networking group. In a particular example, a request to form a group may include a communication from a computing device of a group member indicating that certain individuals are members of a particular group. At 1108, particular tags utilized by the members of the group are identified. For example, the tags utilized by the group members may be extracted from a database. In some cases, the tags utilized by the group members may be stored in a particular database table dedicated to the tags of the group members. In these cases, the associations between the group members, the tags, and the annotations associated with the tags remain intact in another table of the database.

At 1110, one or more of the particular tags are provided to one or more members of the group, where the one or more particular tags are utilized by at least one member of the group. In some cases, the members of the group may send a request to receive each of the tags utilized by members of the group. In other cases, a member of the group may send a request to receive tags utilized by a particular member of the group. A member of the group may also send a request to receive tags utilized by members of the group with respect to a particular electronic book or a particular portion of the electronic book. Further, as tags utilized by members of the group are updated (e.g. addition of tags, deletion of tags, consolidation of tags, etc.), the members of the group may receive indications specifying the updates to the tags. In some cases, the tag updates may be provided to the group members by the annotation tagging service or the service provider server.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer-readable storage media storing computer-readable instructions that, when executed, instruct a processor to perform operations comprising:
   receiving annotations from a plurality of client devices;
   identifying tags associated with at least a portion of the annotations;
   forming a group associated with a plurality of members, each of the plurality of members being associated with a client device of the plurality of client devices;
   receiving a request from a respective client device of a member of the group to obtain tags utilized by an additional member of the group and matching a criterion specified by the request;
   identifying a tag that is utilized by the additional member of the group and that matches the criterion of the request; and
   sending the tag to the respective client device.

2. The computer readable-storage media of claim 1, wherein the criterion includes a keyword.

3. The computer-readable storage media of claim 1, wherein the operations further comprise:
   receiving one or more additional tags utilized by at least one of the members of the group; and
   providing updated tag information to the members of the group, the updated tag information including the one or more additional tags.

4. The computer-readable storage media of claim 1, wherein the criterion specifies a particular portion of an electronic book.

5. The computer-readable storage media of claim 1, wherein the operations further comprise receiving a request to obtain annotations of a of members of the group, wherein the annotations are associated with a particular tag utilized by the members of the group.

6. The computer-readable storage media of claim 1, wherein the operations further comprise receiving a request to obtain annotations associated with a particular electronic book.

7. The computer-readable storage media of claim 6, wherein the annotations provided in response to the request are based, at least in part, on a frequency of tagging of the annotations.

8. The computer-readable storage media of claim 1, wherein the annotations received from the plurality of client devices correspond to content from a plurality of electronic books.

9. A method comprising:
receiving, at a server device, annotations from a plurality of client devices;
identifying tags associated with at least a portion of the annotations;
forming a group associated with a plurality of members, each of the plurality of members being associated with a client device of the plurality of client devices;
receiving a request from a respective client device of a member of the group to obtain tags utilized by an additional member of the group and matching a criterion specified by the request;
identifying a tag that is utilized by the additional member of the group and that matches the criterion of the request; and
sending the tag to the respective client device.

10. The method of claim 9, wherein the criterion includes a keyword.

11. The method of claim 9, further comprising:
receiving one or more additional tags utilized by at least one of the members of the group; and
providing updated tag information to the members of the group, the updated tag information including the one or more additional tags.

12. The method of claim 9, wherein the criterion specifies a particular portion of an electronic book.

13. The method of claim 9, further comprising receiving a request to obtain annotations associated with members of the group, wherein the annotations are associated with a particular tag utilized by the members of the group.

14. The method of claim 9, the request is associated with a particular electronic book.

15. The method of claim 14, wherein the annotations provided in response to the request are based, at least in part, on a frequency of tagging of the annotations.

16. The method of claim 9, wherein the annotations received from the plurality of client devices correspond to content from a plurality of electronic books.

17. A system comprising:
one or more processors;
a communication interface for establishing a communication channel with a plurality of client devices;
computer-readable storage media storing computer-readable instructions that, when executed, instruct the one or more processors to perform operations comprising:
receiving identifying tags associated with at least a portion of the annotations;
forming a group associated with a plurality of members, each of the plurality of members being associated with a client device of the plurality of client devices;
receiving a request from a respective client device of a member of the group to obtain tags utilized by an additional member of the group and matching a criterion specified by the request;
identifying a tag that is utilized by the additional member of the group and that matches the criterion of the request; and
sending the tag to the respective client device.

18. The system of claim 17, wherein the criterion includes a keyword.

19. The system of claim 17, wherein the operations further comprise:
receiving one or more additional tags utilized by at least one of the members of the group; and
providing updated tag information to the members of the group, the updated tag information including the one or more additional tags.

20. The system of claim 17, wherein the criterion specifies a particular portion of an electronic book.

21. The system of claim 17, wherein the operations further comprise receiving a request to obtain annotations of a of members of the group, wherein the annotations are associated with a particular tag utilized by the members of the group.

22. The system of claim 17, wherein the request is associated with a particular electronic book.

23. The system of claim 22, wherein the annotations provided in response to the request are based, at least in part, on a frequency of tagging of the annotations.

24. The system of claim 17, wherein the annotations received from the plurality of client devices correspond to content from a plurality of electronic books.

* * * * *